Figure 3:
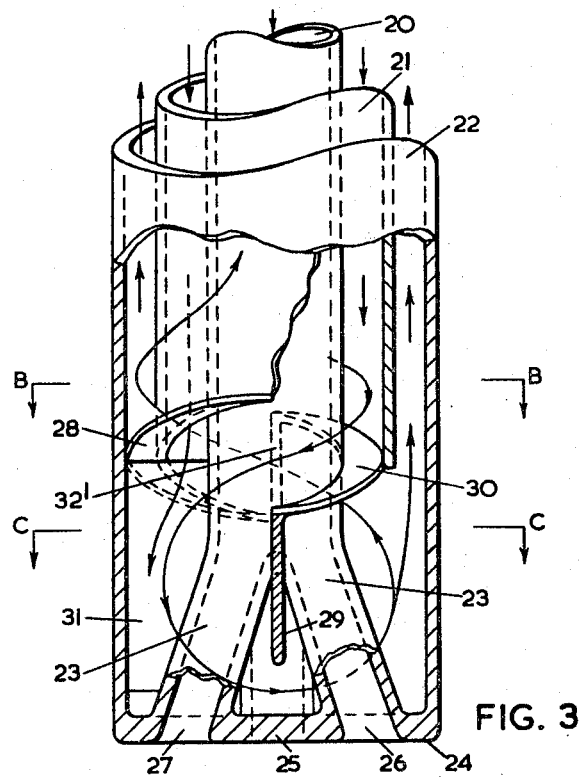

March 21, 1967     D. L. BRYANT ET AL     3,310,238
FURNACE LANCES
Filed June 22, 1965     2 Sheets-Sheet 1
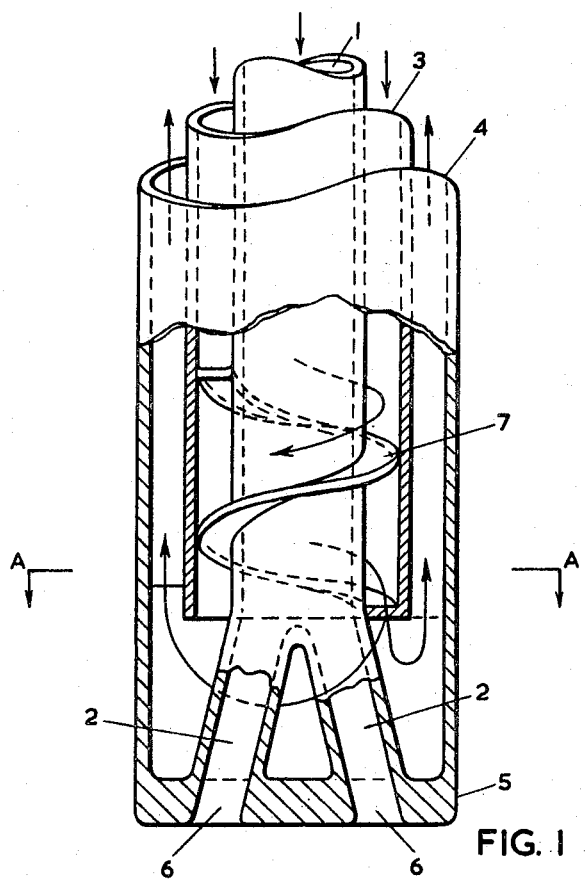
FIG. 1
FIG. 2
INVENTORS
David Lindsey Bryant
Edward T. C. Johnstone
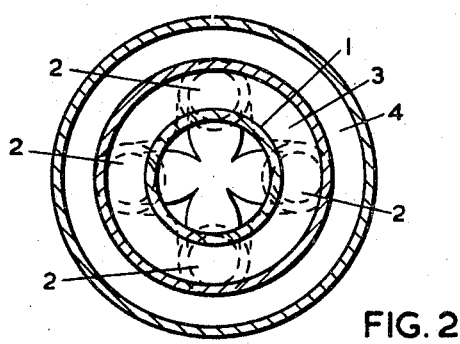
ATTORNEYS March 21, 1967 D. L. BRYANT ET AL 3,310,238
FURNACE LANCES Filed June 22, 1965 2 Sheets-Sheet 2

INVENTORS
David Lindsey Bryant
Edward T. C. Johnstone
BY Townsend & Mesurole
ATTORNEYS

United States Patent Office 3,310,238
Patented Mar. 21, 1967

3,310,238
FURNACE LANCES
David L. Bryant, Engadine, New South Wales, and Edward T. C. Johnstone, Bondi Beach, near Sydney, New South Wales, Australia, assignors, by mesne assignments, to The British Oxygen Company Limited
Filed June 22, 1965, Ser. No. 465,919
Claims priority, application Australia, June 26, 1964, 46,254/64
10 Claims. (Cl. 239—132.3)

The invention relates to improvements in furnace lances of a type suitable for the supply of fluids to the interior of furnaces and the like hot places.

A typical use of such lances occurs in the manufacture of steel when oxygen is to be fed into converters or furnaces, such as, for example, the open hearth, Kaldo, electric, rotor, shaking or stationary ladle types. Such lances are subjected to furnace heat and failure generally occurs due to burning or melting of the lance nozzle tip as a result of ineffective cooling.

It is an object of the present invention to provide a lance which has increased nozzle life.

It is a further object of the present invention to provide a furnace lance which is of simple construction and economical to manufacture.

According to one aspect of the present invention, these objects are achieved by providing a furnace lance including a central duct, and a cooling fluid inlet duct and a cooling fluid outlet duct arranged substantially co-axially of the central duct, the outlet portion of the central duct having two or more branch ducts terminating in outlet nozzles at the lance tip, and wherein at least one of the cooling fluid ducts has a helical member near its end portion in the vicinity of the lance tip to ensure cooling fluid circulation around the branch ducts.

The branch ducts may be arranged so that they are of uniform cross-section throughout their length, increase in cross-section towards their outlet ends, or are convergent-divergent, i.e. having a constricted throat portion before terminating in outlet nozzles at the lance tip.

Water is the preferred cooling fluid.

If desired, each cooling fluid duct may be provided with a separate helical member. In such a case, one of the members may form a barrier across half or another portion of the outer cooling fluid duct while the other member is arranged to form a barrier across half or another portion of the inner cooling fluid duct. Generally, if two helical members are used, they are placed on opposite sides of the lance.

One or more baffles may be provided on or near the branch ducts to assist effective water circulation around them. If desired, these baffles may be attached to the branch ducts, the body of the lance and/or the helical member or members. The baffles are arranged in such manner that water flow, as directed by the helical members, is deflected near the lance tip to ensure effective cooling in that region.

Accordingly, a further aspect of the present invention comprises a furnace lance having a central duct, a cooling fluid inlet duct, a cooling fluid outlet duct, all said ducts being arranged substantially co-axially, the outlet portion of the central duct having two or more branch ducts terminating in outlet nozzles, a first helical member arranged to form a barrier across a portion of the cooling fluid inlet duct and connected to a baffle member extending in the longitudinal direction of the lance, the said baffle member terminating near the end of the furnace lance and traversing at least a substantial part of the width of the said end, and a second helical member circumferentially offset from the first helical member within a portion of the cooling fluid outlet duct and connected to the said baffle, wherein the said helical members and baffle are arranged to separate incoming cooling fluid from outgoing fluid and assist effective circulation of cooling fluid around the branch ducts and nozzle surfaces during operation. The helical members are preferably offset from each other at an angle of 180° so as to lie on opposite sides of the lance.

A further aspect of the present invention includes a furnace lance of the type above described in which the said second helical member is circumferentially offset less than 180° from the first helical member. Also, the second helical member may extend half way or less around the circumference of the cooling fluid outlet duct.

If desired, one or more auxiliary baffles may project outwardly from the branch duct or ducts to the wall of the lance on that side of the main baffle where the second helical member blocks half or less of the outlet duct, the auxiliary baffles terminating near the end of the furnace lance.

Figure 4:
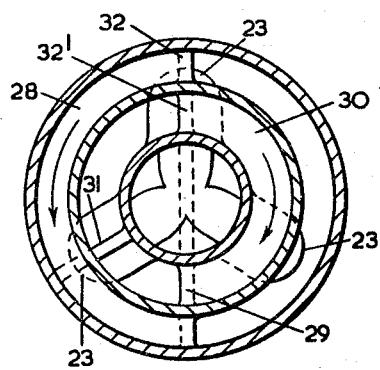
Figure 5:
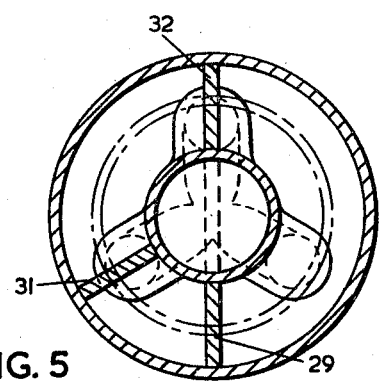

In order that the invention may be more clearly understood, an embodiment of water cooled furnace lances in accordance with the present invention will now be described with reference to the accompanying drawings, wherein FIGURES 1 and 2 illustrate a basic arrangement in accordance with the present invention, and FIGURES 3, 4 and 5 illustrate a preferred embodiment.

More particularly, FIGURE 1 shows a cut-away longitudinal section of the end portion of a furnace lance;
FIGURE 2 illustrates a cross-sectional view taken on the line A—A in FIGURE 1;
FIGURE 3 is a side elevational view in random section of the end portion of a furnace lance;
FIGURE 4 is a cross-sectional view taken on the line B—B in FIGURE 3; and
FIGURE 5 is a cross-sectional view taken on the line C—C in FIGURE 3.

Referring firstly to FIGURES 1 and 2 of the drawings, a central duct casing 1, formed of any suitable material such as, for example, copper, brass or steel piping, has a series of branch ducts 2 formed, for example, by welding additional pipe sections to the end of the central duct casing. Although four branch ducts are shown in FIGURES 1 and 2, it may be preferable in some cases to provide two, three or more than four branch ducts. An annular cooling water inlet duct 3 is formed within a tubular casing of any suitable metal, arranged co-axially around the central duct 1. An annular cooling water outlet duct 4 is provided for by a tubular casing arranged co-axially around the cooling water inlet duct 3. The lance tip 5 is formed at the end of the outlet duct 4 in such manner that the branch ducts 2 terminate at this tip 5 to form nozzles 6. The cooling water inlet duct 3 terminates in the vicinity of the branching of the central duct 1.

A helical member 7 is located in the inlet duct 3, just above the branch ducts 2. The helical member 7 may be manufactured from any suitable metal and fixed to the central duct 1 by any suitable method, such as by welding. For ease of replacement, the tip portion of the furnace lance may be detachably connected to the main portion of the lance by means of detachable clamping bands, or the like.

The other end of the furnace lance (not shown in the accompanying drawings) terminates in water supply connections of known type.

In use of the lance described above, fluid such as oxygen gas is passed down the central duct 1. Water, as cooling fluid, is passed down the annular inlet 3 and returns through the annular outlet duct 4.

The direction of water flow is shown by arrows on FIGURE 1. The water, upon reaching the helical member 7, has induced in it a motion which ensures effective water circulation around the branch ducts 2.

If it is desired to construct a furnace lance with reversed flows of water, the helical member 7 may be placed in the outer duct 4.

Referring now to FIGURE 3, the casing of the central duct 20 is formed of copper piping. A suitable pipe could be 2 gauge material with a 4½ inch outside diameter. The casing of the cooling fluid inlet duct 21, which may be formed from steel piping of ¼ inch thickness, is arranged co-axially around the central duct 20. The casing of the cooling fluid outlet duct 22 is arranged co-axially around the cooling fluid inlet duct 21 to form a furnace lance body having an outside diameter of 7½ inches. In the preferred form, the casing of the cooling fluid outlet duct 22 has a ¼ inch copper wall. The cross-sectional area of the two cooling fluid ducts 21 and 22 is approximately equal. The piping sizes mentioned are suitable for a normal cooling water flow rate to give water velocities of the order of 10 to 20 feet per second.

A series of three branch ducts 23 are formed at the end portion of the casing of the central duct 20 by welding and brazing additional pipe sections of 2¼ inch outside diameter to its end. In a preferred arrangement, pipe sections externally contoured to allow minimal obstruction to water flow may be employed for the casing of the branch ducts. If desired, the branch ducts 23 may be formed in a cast unit which is welded or brazed to the casing of the central duct 20.

The branch ducts 23 terminate in the lance end 24 to form nozzles 25, 26 and 27. The nozzles may be formed either with uniform bore or with a convergent-divergent tapered venturi to give controlled oxygen stream characteristics. The described arrangement having three nozzles is suitable for oxygen flow rates of the order of 13,000 to 18,000 cubic feet of oxygen per minute.

A first helical member 28 is located in the cooling fluid outlet duct 22 at the end of the branch ducts 23 remote from the lance end 24. A baffle 32 extending in the longitudinal direction of the lance is fixed to one end of the first helical member 28. This baffle 32 is arranged to terminate near the lance end 24 in such a manner as to permit cooling fluid to circulate around the branch ducts. A second helical member 30 is arranged at a position substantially 180° from the first helical member 28 within the cooling fluid inlet duct 21. One end of this member 30 is connected to an extension 32′ of the baffle 32 within the inlet duct 21 and the other end is connected to a baffle 29. The baffle 29 is co-planar with the baffle 32 and also terminates short of the lance end 24 as shown.

An auxiliary baffle 31, arranged at substantially 60° to the main baffle 29 terminates near the lance end 24 and extends between the helical member 28, one of the branch ducts 23 and the side wall of the lance.

The direction of water flow is shown by the arrows and lines in FIGURE 3.

If desired, a suitable coating may be applied to the lance end 24, and/or the surface of the casing of the cooling fluid outlet duct 22. The coating may comprise ceramic, non-metallic, metallic, organic, silicon-based, oxide-based or refractory material either individually or in combination.

It will be seen that the above described embodiment of the present invention has two basic features. Firstly, that the cooling water flows across the tip of the lance with a general direction of motion essentially parallel to the lance end and from one side to the other. For example, as will be seen in FIGURE 5, it could flow from the 9 o'clock to the 3 o'clock positions under the baffle 29. The baffle 20 may or may not be fluid-tight with respect to the outer casting of the lance, but does not touch the lance end 24. The distance of the baffle 29 from the lance end 24 and/or the interior surface of the casing of the cooling fluid outlet duct 22 may be altered to control the velocity of the cooling fluid. Additional baffles or fluid guides may be provided in the fluid path to assist in such control.

Secondly, whereas axial annular fluid flow cools the lance body, this type of fluid flow is changed in general to the circumferential or transverse type of flow in the vicinity of the lance end by use of the helical and baffle members.

Many modifications within the spirit and scope of the present invention will be obvious to those skilled in the art. For example, the thickness and material of construction of the central duct, cooling fluid ducts and lance end may be varied. An advantage of the present invention is that the manner of construction of the lance end enables ease of fabrication of the lance end. If desired, the lance end may be of domed configuration.

The factors to be considered in the choice of materials of construction include the nature of fluids and/or entrained powder which is to pass through the central duct, and the degree of abrasion and/or oxidation likely to occur at the nozzles. In some cases, it may be desirable to construct a portion of the fluid casing in one material such as mild steel, while completing the construction at the lower portion near the lance end in another material such as copper.

The present invention provides a simple and effective furnace lance which is economical to manufacture and has increased nozzle life.

We claim:

1. A furnace lance comprising a central tube which terminates short of the end of the lance tip, branch tubes extending from the outlet end of the central tube to the lance tip, a partition tube and an outer tube both arranged coaxially of the central tube and defining therewith a cooling fluid inlet duct, a cooling fluid outlet duct, a helical member near the outlet end of the cooling fluid inlet duct adapted to cause cooling fluid circulation around the branch tubes, and a further helical member situated near the inlet end of the cooling fluid outlet duct; one helical member forming a barrier across approximately half of the cooling fluid outlet duct while the other helical member is arranged to form a barrier across approximately half of the cooling fluid inlet duct.

2. A furnace lance as claimed in claim 1, in which the helical members are arranged on opposite sides of the lance.

3. A furnace lance as claimed in claim 2, in which a baffle is provided near the branch tubes adapted to assist effective circulation of cooling fluid around them.

4. A furnace lance as claimed in claim 3, in which the baffle is attached to the body of the lance.

5. A furnace lance as claimed in claim 3, in which the baffle is attached to the helical member.

6. A furnace lance comprising a central tube which terminates short of the lance tip, branch tubes extending from the outlet end of the central tube to the lance tip, a partition tube and an outer tube both arranged co-axially of the central tube and defining therewith a cooling fluid inlet duct and a cooling fluid outlet duct, a first helical member arranged to form a barrier across a portion of the cooling fluid inlet duct, a first baffle member extending axially of the lance from the first helical member and terminating near the end of the lance and traversing at least a substantial part of the width of the said end, a second helical member circumferentially off-set from the first helical member within a portion of the cooling fluid outlet duct, and a second baffle member extending axially of the lance from the second helical member, the said helical members and baffles being arranged to separate incoming cooling fluid from outgoing fluid and to assist effective circulation of cooling fluid around the branch tubes and nozzle surfaces during operation.

7. A furnace lance as claimed in claim 6, in which the helical members are circumferentially offset from each other at an angle of 180° so as to lie on opposite sides of the lance.

8. A furnace lance as claimed in claim 6, in which the second helical member is circumferentially offset from the first helical member at an angle of less than 180°.

9. A furnace lance as claimed in claim 6 in which the said second helical member extends approximately halfway around the circumference of the cooling fluid outlet duct.

10. A furnace lance as claimed in claim 9, in which an auxiliary baffle projects outwardly from a branch tube to the wall of the lance on the same side of the main baffle as the second helical member, the auxiliary baffle terminating near the end of the furnace lance.

References Cited by the Examiner

UNITED STATES PATENTS

| 2,979,270 | 4/1961 | Hutton | 239—132.3 |
| 3,224,749 | 12/1965 | Berry | 239—132 |

FOREIGN PATENTS

| 254,445 | 9/1964 | Australia. |
| 573,630 | 4/1959 | Canada. |
| 582,139 | 8/1959 | Canada. |
| 594,774 | 3/1960 | Canada. |
| 874,469 | 4/1942 | France. |

M. HENSON WOOD, JR., *Primary Examiner.*

V. M. WIGMAN, *Assistant Examiner.*